Aug. 9, 1966 S. GILMAN 3,265,817

MAGNETIC TAPE CARTRIDGE

Filed Jan. 12, 1962

INVENTOR.
SAMUEL GILMAN

BY Zulwider, Mattingly & Huntley
ATTORNEYS 3,265,817
Patented August 9, 1966

3,265,817

MAGNETIC TAPE CARTRIDGE

Samuel Gilman, Arcadia, Calif., assignor to United Data Control, Inc., Pasadena, Calif., a corporation of Washington Filed Jan. 12, 1962, Ser. No. 165,895
2 Claims. (Cl. 179—100.2)

This invention relates generally to magnetic recording and playback devices, and more particularly to a new and improved tape magazine cartridge of the plug-in variety.

In magnetic recording systems, it has been a common practice to employ tape reels for supporting a length of magnetic tape which, through drive means, permit the tape to move past a magnetic head for recording, playback, erasing or the like. Such reel-type tape storage and transport expedients have not proved entirely satisfactory because of unavoidable distortion introduced in recorded or reproduced signals, e.g., as a result of the variable torque requirements of the tape reeling system as the tape is directed from one reel to the other.

Difficulties encountered with reel-type mechanisms led to the development of continuous loop magazine cartridges where short lengths of tape could be tolerated. In this type of cartridge, the tape is not carried on reels, but is deposited in a compartment and looped about an idler wheel therein that is engageable by an external drive wheel. Also, a portion of the tape is caused to move along the exterior of the cartridge and through suitable guide means past a magnetic head.

In continuous loop tape cartridges heretofore known, a portion of the tape must be made to travel outside the cartridge along a path which brings the tape in contact with the magnetic head. Such handling occasionally results in the tape being spilled, snarled or otherwise damaged. Moreover, the tape is unavoidably exposed to dust and other foreign matter, the accumulation of which prevents satisfactory recording and reproduction of signals.

An additional problem confronting users of the prior art devices has been the alignment of the magnetic tape medium from the cartridge with the external magnetic head. In this regard, the alignment between a playback head and the tracks of recorded information on a magnetic tape can seriously affect the quality of reproduction of the recorded information. In interchanging tape magazine cartridges, on the same recorded or from one recorder to another, the alignment of the heads and the recorded tracks of information on the tape must be to an extremely close tolerance for satisfactory reproduction. The latter criticality of alignment also effects the maximum number of adjacent channels which may be safely recorded on a given tape.

Accordingly, it is an object of the present invention to provide a new and improved continuous loop magnetic tape cartridge structure which overcomes the above and other disadvantages of the prior art.

Another object is to provide a sealed continuous loop magnetic tape cartridge which eliminates the need for external threading or handling of the tape, and avoids contamination of the tape.

A further object of the invention is the provision of a magnetic tape cartridge structure employing a continuous loop of tape and which embodies its own head system and thereby eliminates the need for alignment of the tape with an external head mechanism.

Yet another object of the present invention is the provision of a magnetic tape cartridge capable of an increased number of recorded channels for a continuous loop of tape of given width than can be tolerated in such cartridges of the prior art.

Another object of the invention is the provision of a jam-free, constant speed, low-tension tape drive means within a magnetic tape cartridge to increase the life of the tape medium stored within the cartridge.

The above and other objects of this invention will be better understood by reference to the following detailed description when considered in connection with the accompanying drawings of an illustrative embodiment thereof, wherein.

Figure 1:
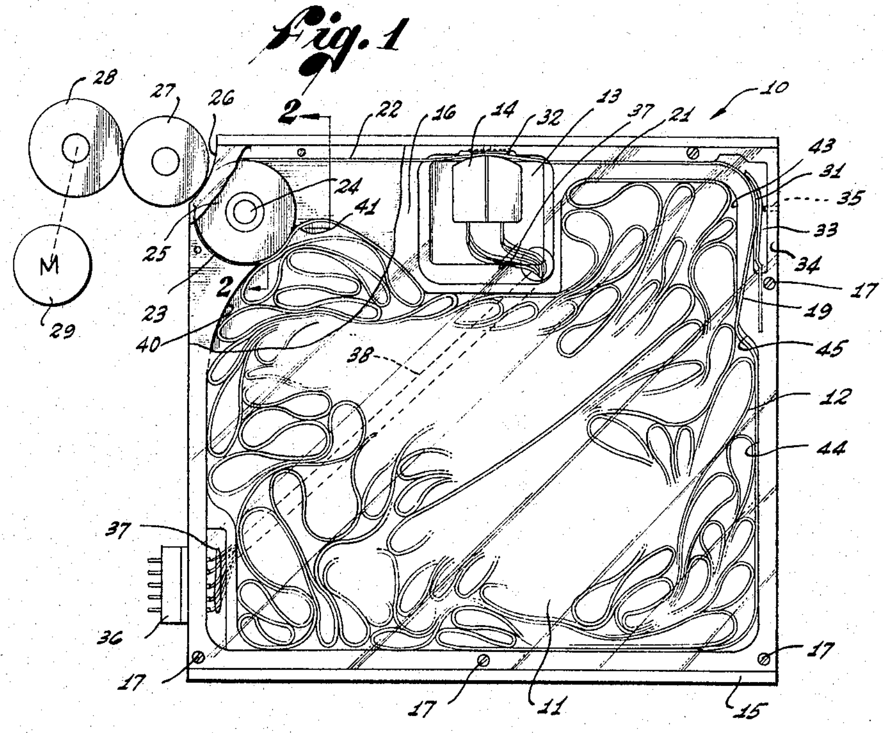
FIGURE 1 is a top plan view, partly in section, of a magnetic tape cartridge of my invention, showing the random orientation of the continuous loop of tape and the cooperatively arranged low-tension tape drive means and magnetic head contained within the cartridge.

Referring now to the drawings, there is shown in FIGURE 1 a magnetic tape magazine cartridge 10 adapted for random storage of a single loop of continuous magnetic tape 12 within a sealed structure. The cartridge 10 integrally incorporates a suitable magnetic head structure within the sealed structure unit, and embodies novel, low-tension tape drive and guiding means for selectively transporting the tape 12 and bringing it into engagement with the head 14.

The cartridge 10 includes a casing 15 of any suitable rigid structural material. The casing 15 houses the various structural components of the cartridge 10 and is provided with a cover plate 16 (see FIGURE 2). The cover plate 16 is attached to the casing 15 to provide a magazine cartridge 10 which is essentially completely sealed to prevent exposure of the various components of the cartridge to dust or foreign matter. The expedient by which the cover plate 16 is secured to the casing 15 may be any suitable fastening means 17 known in the art, such as screws or the like, and is preferably of a nature which enables removal of the cover plate 16 from the casing 15 to facilitate maintenance or repair of the cartridge.

As indicated in FIGURE 1, the cartridge 10 has a compartment 11 for the storage of the continuous loop of magnetic tape 12 in a randomly folded fashion within the storage compartment.

The cartridge 10 also includes a head compartment 13 for housing the magnetic head 14. Although the head 14 is shown as a single unit, it is to be understood that a plurality of tape head structures may be housed within the head storage compartment 13 for recording, playback, erasing, etc.

As indicated in FIGURE 1, the orientation of the tape 12 within the storage compartment 11 is such as to avoid tightly packed layers. For this purpose, the tape 12 is placed in the compartment 11 with one edge resting on the floor of the compartment, and is effectively stuffed into the compartment so that it is formed into a plurality of loose, random folds. The cover plate 16 is so located as to confine the tape in the compartment, and the tape fills the compartment sufficiently that throughout its length, the edges of the tape are in planes perpendicular to the compartment floor.

As will become evident, such a random storage arrangement minimizes print-through and cross-talk. The random storage design also has the advantage of not requiring one layer of tape to be in constant motion with relation to adjacent layers of tape. This results in increased tape life and eliminates the possibility of malfunction due to one layer of tape adhering to another tape layer.

In utilizing the tape 12 for either recording or playback operations, it is necessary to direct the tape in a manner so that it may appropriately engage the head 14 and thereafter be returned to the compartment 11. To accomplish these functions, a portion of the tape 12 is threaded, prior to the installation of the cover plate 16 upon the casing 15, through slots 19, 21, 22, 23 in the casing 15. As shown, the slots 19, 21, 22, 23 extend outside the tape compartment 11, and the slots 21, 22 pass to the outer portion of the head compartment 13. In the head compartment 13, the tape 12 is passed over the head unit 14 to bring the tape in engagement therewith.

Between the slots 22, 23, the tape 12 is passed around a tape roller 25, which is adapted to rotate on a fixed spindle 24 on the casing 15. The roller 25 fits in a mating receptacle in the casing. Thus, the slot 23 is defined by confronting surface portions of the roller 25 and the roller receptacle to provide a slot having a moving wall in contact with the tape 12.

By securing the head 14 to the casing in the compartment 13, so that it is an integral part of the over-all magazine cartridge 10, I eliminate many of the problems encountered with prior art systems utilizing head units that are separate from the magazine cartridge. By incorporating the head as an integral part of the magazine cartridge, the same head is used for both recording and playback of the tape 12 stored within the magazine cartridge 10. In this manner, the problem of alignment of the tape with respect to the head, a problem which has plagued users of tape recorders since their conception, is obviated. Faithful reproduction of the recorded signals is assured because magnetic track misalignment and gap scatter problems are minimized.

Furthermore, since each magazine cartridge 10 carries its own head unit 14, the cartridge need only be mechanically aligned with a suitable drive means. Therefore, cartridges from different recorders can readily be interchanged without problems posed with prior art cartridges. Moreover, because of the inherent accuracy of alignment between the tape 12 and the head unit 14, my invention permits the use of a greater number of recorded tracks or channels for a given width of tape than can be tolerated in prior art mechanisms.

The width of the slots 19, 21, 22, 23 in the casing 15 is such as to permit free passage of the tape without binding or jamming. In this regard, the width of the aforementioned slots must be sufficiently narrow to prevent accumulation or buckling of the tape 12 within the slots, yet sufficiently wide to pass a splice (not shown) between the two ends of the tape forming the continuous loop. In actual practice, slot widths of the order of magnitude of 1½ to three times the thickness of the tape 12 have proved to be satisfactory.

After the tape 12 has been threaded in the aforedescribed manner, the cover plate 16 is secured to the casing 15 to seal the magazine cartridge 10. Once this has been done, the tape is protected from damage which might ordinarily be incurred by handling or exposure to dust or foreign matter. In this connection, only a very short portion of the tape passed around the roller 25, e.g., 0.25 inch, is exposed through a slot provided in the roller receptacle for permitting an external drive member 27 to engage the tape and rotate the roller 25. Since the head unit 14 is wholly within the magazine cartridge 10, no additional external threading of the tape 12 is required in utilizing the cartridge. Hence, it is virtually impossible to tangle, spill or damage the tape while handling the magazine.

The tension applied to the tape 12 during its transport within the magazine cartridge 10 is such as to overcome friction between the tape and a pair of appropriately positioned pressure pads 31, 32. The pressure pad 31 is carried on one end of a leaf spring element 33 disposed in a groove 34 that is located between the slots 19, 21, the other end of the spring element 33 being secured to the casing 15. The position of the spring element 33, and hence the pressure applied to the tape 12 by means of the pad 31, may be selectively adjusted, as by an adjusting screw 35 supported in the casing. The pressure pad 32 is located immediately adjacent the head 14, and keeps the tape 12 in engagement with the head unit 14.

The magazine cartridge 10 is adapted to be connected into an appropriate electrical system by means of an electrical contact plug 36 mounted on one side of the casing 15. The electrical wires 37 from the plug 36 are directed to the head compartment 13 for connection to the head 14. The wires 17 are passed through a suitable recess or channel 38 which is also provided in the bottom surface of the base 15.

It will be apparent that the frictional engagement between the tape 12 and the roller 25 causes the tape 12 to travel as the roller 25 rotates about the spindle 24. To impart rotation to the roller 25, the casing 15 is provided with a recess 26 to enable the drive means 27, which is shown as an idler wheel, to be selectively placed into engagement with the tape roller 25. A suitable capstan 28 effects rotation of the idler 27, and hence of the roller 25.

The capstan 28 may be driven by a suitable motive means 29 and, by way of the intermediary idler 27, imparts rotary motion to the tape roller 25. The forces of tension which are overcome by the tape roller 25 in transporting the tape 12 are determined by the pressure of the pads 31 and 32 upon the tape. Hence, a low-tension, jam-free tape drive system is provided. By virtue of these low-tension characteristics, the life of the tape 12 is considerably enhanced and, therefore, a greater number of useful plays of recorded material is possible before replacement of the tape is needed.

The aforedescribed tape drive system has the additional advantage of being a very low inertia system in operation. In this regard, the only inertia forces are those of the weight of the tape itself. Therefore, the drive system is constant speed, constant torque, and extremely positive in its action. In this regard, complicated braking systems are not required, and wow and flutter distortion is substantially avoided.

It will be noted from FIGURE 1 that the movement of the tape 12 through the cartridge 10 is enhanced by storing the tape within the compartment 11 so that the loops immediately adjacent the slots 19, 23 are parallel to the directions of exit and entry. Hence, it will be observed that the loops of tape 12 are generally parallel to the slot 19 on one side of the compartment 11, and generally parallel to the inner end of the slot 23 on the other side of the compartment. Also, all wall surfaces of the compartment 11 are smooth, and all transitions between surfaces of different curvature are rounded.

To the end that the tape upon entering the compartment through the slot 23 will move into the desired loose folds, e.g., via counterclockwise rotation of the roller 25, the wall portions 40, 41 immediately adjacent the inner end of the slot 23 follow a curved path that passes close to the tangent to the inner portion of the roller 25. To facilitate unfolding of loops drawn through the straight slot 19, the inner end of the slot 19 is between parallel wall portions 43, 44 and at the inner end of an S-shaped transition 45 between these parallel wall portions. By virtue of this arrangement, the folds adjacent the slot 23 are smaller and more closely packed than those adjacent the slot 19.

Figure 2:
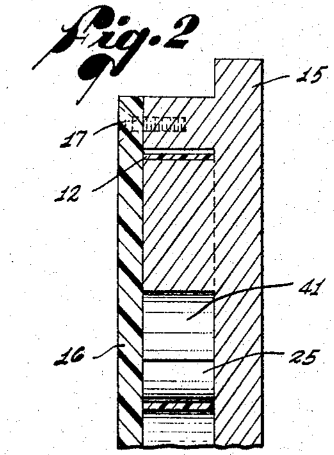
FIGURE 2 is an enlarged fragmentary sectional view taken along the line 2—2 of FIGURE 1, showing the orientation of the tape with respect to the guide means and drive means within the cartridge structure.
Figure 3:
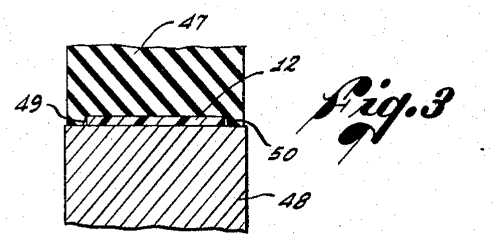
FIGURE 3 is an enlarged fragmentary sectional view of an alternative low-tension tape driving means which minimizes slippage of the tape.

It will be observed that the tape roller 25 is shown in FIGURE 2 to be of the same width as the tape 12. In FIGURE 3, both the idler 47 and the tape roller 48 are shown to be wider than the tape 12. Either one of these elements may be made of a flexible, resilient material, as indicated for the idler 47. By utilizing such an arrangement of contacting resilient and non-resilient rollers, a more positive drive is accomplished, and the tape 12 is less prone to slippage. The reason for this is that the resilient idler distorts under pressure and pinches over the edges 49, 50 of the tape 12 to enhance the gripping action between the idler 47 and the tape 12, and also between the idler 47 and the tape roller.

The magnetic tape cartridge 10 of the present invention not only provides a novel combination of random storage tape facilities in a system embodying integral head facilities and low-tension drive means. It also provides a rugged, compact unit possessing extremely high performance reliability, quality and a marked lack of susceptibility to tape damage.

It will be apparent from the foregoing that, while a particular form of my invention has been illustrated and described, various modifications can be made without departing from the spirit and scope of my invention. Accordingly, I do not intend that my invention be limited, except as by the appended claims.

I claim:

1. A magnetic tape cartridge wherein the environmental effects of dust, and the like, and handling of the tape are minimized despite the location of prime motive means for driving said tape exteriorly of said cartridge, said cartridge comprising: a cartridge housing sealed and closed except at one segment thereof wherein an opening in said housing is located; a bin for randomly storing a continuous loop of magnetic tape within said housing; a roller within said cartridge housing, a portion of said roller extending through said opening and forming with a circular member of said motive means pinching means for translating said tape; said opening being only large enough to enable said roller to engage said circular member; a head unit within said housing and integral therewith, said head unit engaging a portion of said tape; and guide means including a plurality of constant width elongated slots within said housing, said tape being guided to said head unit and about said roller via said slots and remaining within the confines of said housing except as it passes over said roller, said slot about said roller having an exit for feeding said tape tangentially to an adjacent guide within said bin, the width of said slots being dimensioned relative to the thickness of said tape to permit passage of a tape splice while preventing buckling of said tape as it passes from said bin to said head unit via said slots.

2. The cartridge of claim 1 wherein the width of said slots is between one and one-half to three times the thickness of said tape.

References Cited by the Examiner

UNITED STATES PATENTS

| | | | |
|---|---|---|---|
| 2,477,146 | 7/1949 | Scherbatskoy | 179—100.2 |
| 2,542,506 | 2/1951 | Gibson | 179—100.2 |
| 2,679,394 | 6/1954 | Lear | 179—100.2 |
| 2,899,507 | 8/1959 | Martel | 179—100.2 |
| 3,093,284 | 6/1963 | Mullin | 226—191 |
| 3,109,989 | 11/1963 | Gray | 179—100.2 |
| 3,140,360 | 7/1964 | Whitworth | 179—100.2 |

FOREIGN PATENTS

| | | |
|---|---|---|
| 357,559 | 11/1961 | Switzerland. |

BERNARD KONICK, *Primary Examiner.*

IRVING SRAGOW, *Examiner.*

J. R. GOUDEAU, P. F. ROTH, *Assistant Examiners.*